April 1, 1969

R. P. MURRAY 3,436,640

FUNCTION GENERATOR APPARATUS

Filed July 31, 1963

INVENTOR.
RAYMOND P. MURRAY
BY
Paul M. Klein Jr.
ATTORNEY

United States Patent Office 3,436,640
Patented Apr. 1, 1969

3,436,640
FUNCTION GENERATOR APPARATUS
Raymond P. Murray, 28 Sierra Vista Drive,
Monterey, Calif. 93940
Filed July 31, 1963, Ser. No. 299,128
Int. Cl. H02m 3/22, 5/40, 1/08
U.S. Cl. 321—2
13 Claims The invention described herein may be manufactured and used by or for the Government of the United States of America for governmental purposes without the payment of any royalties thereon or therefor.

This invention relates to function generator apparatus and more particularly to apparatus including a function generator which uses for its power supply the signal power from an AC signal source, such as an auxiliary oscillator, and which generates a function whose amplitude and frequency are controlled by, respectively, the amplitude and frequency of the signal from said AC signal source, whereby said apparatus can utilize the frequency and amplitude controls of the AC signal source to control the frequency and amplitude of the generated function. By the term "function generator" is meant, as the term in this context is commonly understood in the art, an apparatus which generates from an input signal a function, constituting an output signal, of such a shape that the equation representing the variation with time of the value of the function, during the interval when the value of the function is not zero, differs substantially from the equation representing the variation with time of the value of the input signal.

In prior art apparatus, a separate power source, such as batteries or 115 volts AC house current, was required in many function generators except for such attempts as diode clippers aimed at producing square waves from an AC input signal from an auxiliary oscillator. Such attempts yield a wave of greatly inferior rise time and amplitude. Furthermore, prior art circuits do not use the amplitude control of the AC signal source, such as an auxiliary oscillator, as the square wave amplitude control.

An object of the present invention is to provide a function generator adapted to generate a function when excited by an AC signal input from an AC signal source, such as an auxiliary oscillator, and requiring no power separate from that provided by the AC signal input from the AC signal source.

Another object is to provide an apparatus in which the function generator of this invention is connected to an AC signal source, exemplified by an auxiliary oscillator, to generate a function using the signal output of the source (e.g. the oscillator) as the power source for the function generator and using the amplitude and frequency controls of the source (e.g. the auxiliary oscillator) to control the amplitude and frequency of the function generated.

Other objects, advantages and novel features of the invention will become apparent from the following detailed description when considered in connection with the accompanying drawings wherein.

Figure 1:
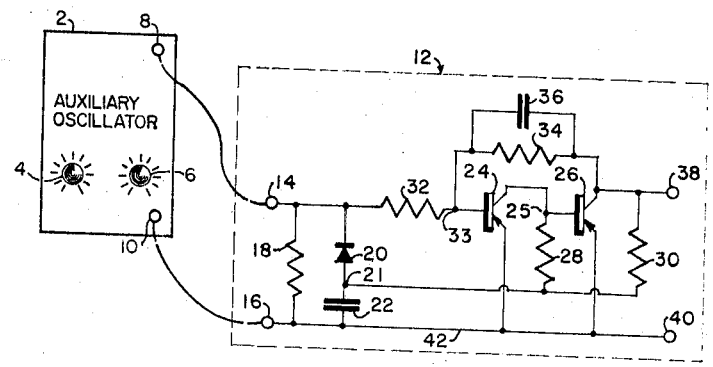
FIG. 1 is a shematic diagram of the inventive combination of an AC signal source (exemplified by an auxiliary oscillator) with the inventive function generator of this invention exemplified by a square wave generator.

The invention comprises several inventive concepts, some enunciated hereinafter, and among which is a function generator containing one or more active elements, and requiring, to provide for a DC supply to the active element or elements, no power source other than the input signal from an AC signal source to which the function generator is adapted to be connected. That is, the function generator requires for its DC demands no power supply in the conventional sense such as a battery, or a power supply unit or power pack energized from what is commonly regarded as a power source such as e.g. 115 volts house current. The function generator is adapted to be excited by AC input signal obtained from an AC signal source such as an auxiliary oscillator exemplified by an audio oscillator, a video oscillator, a signal generator, or the like. The signal power out of the AC signal source is used to power the function generator; the rectified signal from the AC signal source provides the DC demands for the active elements of the function generator. The invention avoids the need for separate controls for the function generator: the frequency and amplitude controls of the AC signal source such as the auxiliary oscillator are used to control the frequency and amplitude of the function generated by the function generator and the on-off control of the AC signal source also serves for the function generator.

The invention also comprehends the combination of the novel function generator aforementioned with the AC signal source, especially with an auxiliary oscillator. The function generators embodied in the invention may generate many types of functions and include both adaptations of prior art function generators to bring them within the inventive concept and completely novel function generators such as the square wave generator shown in FIG. 1.

The term "active element," as used in this application, has a meaning common in network analysis: an element constituting a controlled source of energy or of voltage or of current. An "active element" in this sense may also be called a "dependent generator." The output of the active element is controlled by or dependent on a control signal which is a voltage or current in the network of which the element is a part. Active elements are exemplified by electronic control devices such as electron tubes and transistors which typically have emitter electrodes, collector electrodes, and control electrodes. Active elements are distinguished from passive elements exemplified by resistors, capacitors, inductors, and the like, which are not sources of energy at all. "Active element" is also distinguished from "non-passive element," a term which is broad enough to include a battery which is not a controlled energy source, i.e. a generator dependent on a control signal.

Active elements typically have DC demands. They may require DC bias, which includes the DC voltage and/or current maintained between two electrodes or elements of such devices as electron tubes and transistors to establish operating conditions or an operating point. Typically, also, active elements may be said to use DC power since current consumed by these elements during their operation, as well as current which may be required for bias, is usually supplied by a DC source. Thus, when referring to the notion of supplying DC power to active elements, it is intended to include the supplying of all their DC demands including bias and current used for operating the active elements.

The term terminal, as used in the phrases input terminals and output terminals found in this application, is obviously not restricted to referring to only the actual binding posts, plugs, sockets or clips, commonly found on electronic gear but means any conductor directly connected to the actual terminating appendage and thus having essentially the same potential as the terminating appendage.

Several preferred embodiments of the invention are illustrated in FIGS. 1, 2, 3, and 4 in the form of generators for generating different functions such as square waves, pips, and rectangular pulses. The invention is, however, applicable to function generators for generating a wide variety of functions. In each instance one inventive concept is illustrated by a self-contained function generator or section thereof and adapted for attachment to an AC signal source, such as an auxiliary oscillator, from the signal of which it receives all its power; and a second inventive concept is illustrated by the combination of the function generator with an AC signal source such as an auxiliary oscillator. For simplicity and to avoid repetition in the drawing, only FIG. 1 shows the actual combination but the application is to be regarded as also applied to FIGS. 2, 3, and 4. For illustration, only, the circuits in the drawing exemplify the active elements by transistors.

Reference is now made to the drawing, FIG. 1, in which there is shown an AC signal source exemplified by an auxiliary oscillator 2 having an amplitude control knob 4, a frequency control knob 6, and output terminals 8 and 10. The output from the output terminals 8 and 10 of the auxiliary oscillator is applied to a function generator exemplified in FIG. 1 as a square wave generator indicated generally at 12 and having a pair of input terminals 14, 16, into which is fed the output of the auxiliary oscillator. Connected across the input terminals 14, 16 is a resistor 18 which serves as a damping resistor when the device is used with an oscillator having an inductive output circuit. When the device is used with an oscillator having a capacitive output, resistor 18 reduces the DC component out of the oscillator which results from leakage through the output coupling capacitor.

Diode 20 and capacitor 22 act as a half-wave rectifier and capacitor filter thereby generating a DC source from the input signal. This DC voltage has an amplitude slightly less than the peak value of the negative input voltage. This DC source provides the necessary DC power for bias and for operation of the transistors 24 and 26.

Figure 1A:
FIG. 1a shows the output of the apparatus of FIG. 1.

Transistors 24 and 26, together with biasing resistors 28 and 30 comprise a two-stage direct-coupled common-emitter amplifier. Application of an AC input voltage causes the amplifier to be overdriven and thus produces a square wave output voltage. Resistor 32 acts as a current limiting resistor on the negative cycle of the input voltage and as a protective voltage dropping resistor on the positive cycle of the input voltage. It also serves as a current-limiting resistor in the event that transistor 24 should break down upon the application of inverse voltage. Resistor 34 provides positive feedback thereby improving the rise time of the generated square wave especially at low input frequencies. A further purpose of resistor 34 is to control the symmetry of the generated square wave. Capacitor 36 provides positive AC feedback thereby improving the rise time of the generated square wave especially at low input frequencies. The square wave output appears across output terminals 38 and 40 and is illustrated in FIG. 1a. The conductor 42 is the ground of the oscillator and the frame of the square wave generator.

Since transistor 26 is driven to cutoff and saturation, the amplitude of the output square wave is just slightly less than the DC voltage across capacitor 22. Thus the amplitude of the square wave can be controlled by means of the input voltage without significant change in wave shape. The input voltage is normally adjusted by means of the amplitude control knob 4 on the auxiliary oscillator. Similarly, the frequency of the square wave is controlled by the frequency control knob 6 on the auxiliary oscillator and the on-off switch of the oscillator (not shown) serves to turn the square wave generator on and off.

This square wave generator, with a minimum of equipment, produces a high quality square wave having a fast rise time from an AC signal source, exemplified by an auxiliary oscillator, the square wave amplitude being very nearly equal to the peak value of the negative input signal. No power supply need be provided and, as explained, no controls need be provided since the auxiliary oscillator supplies these needs.

While PNP transistors are shown in the drawing in FIG. 1, NPN transistors can be employed provided the polarity of the diode 20 and filter capacitor 22 are reversed. The output would then be a positive square wave. Similar alternative selection of transistors can be made in the other illustrated circuits.

The invention comprehends as one inventive concept the function generator entity lying between and including terminals 14, 16 and 38, 40; and as an additional inventive concept the combination of this entity with the AC signal source exemplified by auxiliary oscillator 2.

Figure 2:
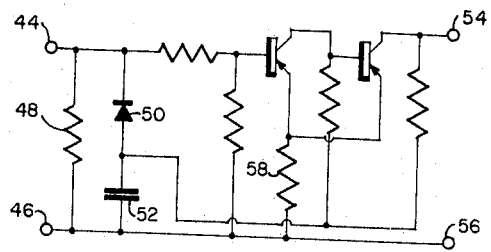
FIG. 2 is a schematic diagram of an adaptation of a Schmitt trigger square wave generator acording to the invention.
Figure 2A:
FIG. 2a shows the output of the apparatus of FIG. 2.

FIG. 2 illustrates another form of square wave generator known as a Schmitt trigger. In using this square wave generator, the input terminals 44, 46 are connected to the output terminals of an AC signal source such as an auxiliary oscillator. Resistor 48 performs the same function as its counterpart resistor 18 in FIG. 1. Diode 50 and capacitor 52 constitute a rectifying filter circuit for supplying DC power to the generator. The remainder of the circuit is a more or less conventional Schmitt trigger with its output appearing across terminals 54, 56. The output voltage is reduced by the amount of voltage lost across the feedback resistor 58.

Although the circuit of FIG. 2 does produce a square wave, the circuit of FIG. 1 performs better. It is more efficient and gives a greater voltage output, this being a very important consideration in this device since it is powered by the input signal. It also performs better over a wide range of voltage levels, giving fast rise times for very small input signal voltages.

Here again, as in FIG. 1, two inventive concepts are illustrated: the actual circuit illustrated and the combination with it of any AC signal source such as an auxiliary oscillator connected at 44 and 46.

Figure 3:
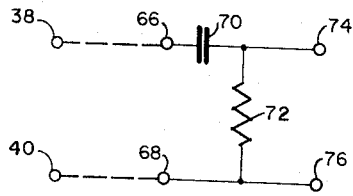
FIG. 3 is a schematic diagram of a circuit to be connected across the output of a square wave generator to convert it into a trigger pulse generator.
Figure 3A:
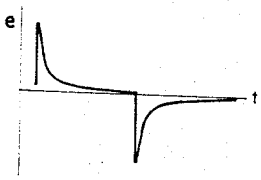
FIG. 3a shows the output of the apparatus of FIG. 3.

Another function generator using the principle of the present invention is illustrated in FIG. 3 which shows a circuit to be supplied at its input terminals 66, 68 with the square wave output from a circuit such as that of FIG. 1. The condenser 70 and resistor 72 constitute a circuit for differentiating the output of the square wave generator to produce at output terminals 74, 76 trigger pulses such as illustrated in FIG. 3a. The inventive concepts here include: the entity constituted by the combination lying between and including terminals 14, 16 and terminals 74, 76 with terminals 66, 68 connected, respectively, to terminals 38, 40; and the combination with this entity of an AC signal source such as auxiliary oscillator 2 connected thereto as shown.

Figure 4:
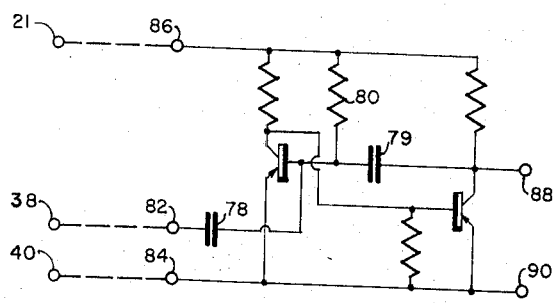
FIG. 4 is a schematic diagram of a circuit to be combined with a square wave generator such as FIG. 1 to produce a pulse generator.
Figure 4A:
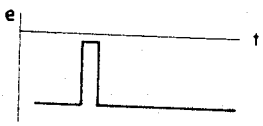
FIG. 4a shows the output of the circuit of FIG. 4.

Still another example of a function generator according to the present invention is a pulse generator shown in FIG. 4 whose amplitude and frequency is controlled by the controls on the auxiliary oscillator or other AC signal source but whose pulse duration is adjustable by means of capacitor 79 and resistor 80. These latter elements are illustrated as of fixed values but obviously may be variable. The circuit includes input terminals 82 and 84 supplied from the output 38, 40, respectively, of the basic square wave generator such as shown in FIG. 1. The power supply connection to terminal 86 is taken from the power supply of the basic square wave generator of FIG. 1 by connecting to the top side of capacitor 22. The remainder of the circuit is seen to be a standard circuit of a one-shot multivibrator with its output at terminals 88 and 90 illustrated in FIG. 4a. There the inventive concepts include: the entity lying between and including the terminals 14, 16 and 88, 90 with terminal 86 connected to the top side of capacitor 22; and the combination with this entity of the auxiliary oscillator 2 or other AC signal source.

Various changes can be made in the power supply within the concept of the invention. For example, a voltage multiplying rectifier circuit can be used to advantage in some cases. Obviously many other modifications and variations of the present invention are possible in the light of the above teachings. It is therefore to be understood that within the scope of the appended claims the invention may be practiced otherwise than as specifically described.

By way of illustration only, typical values for components and voltages for an embodiment of the arrangement of FIG. 1 are the following.

| | |
|---|---|
| 38–40 (output voltage) | 36 volts max. |
| 14–16 (input voltage) | 26 volts. R.M.S. volts max. |
| 28 | 15000Ω. |
| 30 | 1500Ω. |
| 32 | 15000Ω. |
| 34 | 56000Ω. |
| 18 | 1000Ω. |
| 24 | 2N2188. |
| 26 | 2N2188. |
| 20 | 1N537. |
| 22 | 500 μf, 50 v. |
| 36 | 15 μμf. |

What is claimed is:

1. A function generator, adapted for use with an AC signal source and having no power source other than the input signal from said signal source, comprising
 a pair of input terminals to be connected to the signal output terminals of said AC signal source;
 a rectifying network including a diode connected in series with a filter capacitor across said input terminals to rectify and filter the signal output of said AC signal source applied to said input terminals;
 a function-generating network comprising a plurality of transistors;
 means for supplying DC power to said function-generating network from said rectifying network; and
 means for supplying signal from said input terminals to said function-generating network.

2. The function generator of claim 1 wherein said function-generating network includes means for generating, from a signal input to said network, a function, constituting its output signal, whose amplitude and frequency are controlled by, respectively, the amplitude and frequency of the signal input to said function-generating network.

3. An apparatus comprising
 an AC signal source constituted by an auxiliary oscillator having means for varying the amplitude and frequency of its output signal; and
 a function generator; said function generator having no power source other than the input signal from said signal source and comprising
  a pair of input terminals connected to the signal output terminals of said AC signal source;
  a rectifying network including a diode connected in series with a filter capacitor across said input terminals to rectify and filter the signal output of said AC signal source applied to said input terminals;
  a function-generating network comprising a plurality of transistors;
  means for supplying DC power to said function-generating network from said rectifying- network; and
  means for supplying signal from said input terminals to said function-generating network;
  said function-generating network including means for generating, from a signal input to said network, a function, constituting its output signal, whose amplitude and frequency are controlled by, respectively, the amplitude and frequency of the signal input to said function-generating network, whereby said amplitude and frequency control means of said auxiliary oscillator, control, respectively, the amplitude and frequency of the function generated by said function generator.

4. A function generator, adapted for use with an AC signal source and having no power source other than the signal from said signal source, comprising
 a pair of input terminals to be connected to the output terminals of said signal source;
 means connected to said input terminals for rectifying signal applied to said input terminals;
 an active-element-containing function-generating network of the type which is a network for generating from an input signal a function, constituting an output signal, of such a shape that the equation representing the variation with time of the value of the function, during the interval when the value of the function is not zero, differs substantially from the equation representing the variation with time of the value of the input signal;
  said network including means whereby the amplitude and frequency of said function generated by said network are controlled by, respectively, the amplitude and frequency of said input signal;
 means for supplying DC power from said rectifying means to the active elements of said function-generating network; and
 means for supplying to said function-generating network input signal from said input terminals.

5. An apparatus comprising, as an AC signal source, an auxiliary oscillator; and
 a function generator, said function generator having no power source other than the signal from said signal source, and comprising
  a pair of input terminals connected to the output terminals of said signal source;
  means connected to said input terminals for rectifying signal applied to said input terminals;
  an active-element-containing function-generating network of the type which is a network for generating from an input signal a function, constituting an output signal, of such a shape that the equation representing the variation with time of the value of the function, during the interval when the value of the function is not zero, differs substantially from the equation representing the variation with time of the value of the input signal;
   said network including means whereby the amplitude and frequency of said function generated by said network are controlled by, respectively, the amplitude and frequency of said input signal;
  means for supplying DC power from said rectifying means to the active elements of said function-generating network; and
  means for supplying to said function-generating network input signal from said input terminals.

6. A function generator for generating square waves from the signal output of an AC signal source comprising
 a pair of input terminals;
 a resistor connected across said input terminals;
 a diode connected in series with a filter capacitor across said terminals to rectify signal input to said terminals;
a first transistor having its base connected through a resistor to one of said terminals, its emitter connected directly to the other of said terminals and one side of said filter capacitor, and its collector connected through a resistor to the other side of said filter capacitor;
a second transistor having its base connected directly to the collector of said first transistor, its emitter connected directly to the emitter of said first transistor, and its collector connected through a resistor to said second-mentioned side of said filter capacitor;
a feedback resistor connected between the collector of said second transistor and the base of said first transistor; and
means for taking off the output from said function generator between the emitter and collector of said second transistor.

7. The function generator of claim 6 further including a feedback capacitor connected in parallel with said feedback resistor.

8. An apparatus including, as an AC signal source, an auxiliary oscillator; and
a function generator for generating square waves from the signal output of an AC signal source comprising
 a pair of input terminals connected to the output terminals of said oscillator;
 a resistor connected across said input terminals;
 a diode connected in series with a filter capacitor across said input terminals to rectify signal input to said input terminals;
 a first transistor having its base connected through a resistor to one of said input terminals, its emitter connected directly to the other of said input terminals and one side of said filter capacitor, and its collector connected through a resistor to the other side of said filter capacitor;
 a second transistor having its base connected directly to the collector of said first transistor, its emitter connected directly to the emitter of said first transistor, and its collector connected through a resistor to said second-mentioned side of said filter capacitor;
 a feedback resistor connected between the collector of said second transistor and the base of said first transistor;
 a feedback capacitor connected in parallel with said feedback resistor; and
 means for taking off the output from said function generator between the emitter and collector of said second transistor.

9. An apparatus including
a function generator for generating square waves from the signal output of an AC signal source comprising
 a pair of input terminals;
 a resistor connected across said input terminals;
 a diode connected in series with a filter capacitor across said terminals to rectify signal input to said terminals;
 a first transistor having its base connected through a resistor to one of said terminals, its emitter connected directly to the other of said terminals and one side of said filter capacitor, and its collector connected through a resistor to the other side of said filter capacitor;
 a second transistor having its base connected directly to the collector of said first transistor, its emitter connected directly to the emitter of said first transistor, and its collector connected through a resistor to said second-mentioned side of said filter capacitor;
 a feedback resistor connected between the collector of said second transistor and the base of said first transistor;
 a feedback capacitor connected in parallel with said feedback resistor; and
 means for taking off the output from said function generator between the emitter and collector of said second transistor;
a resistor and capacitor connected in series across the output means of said square wave generator; and
means for taking a trigger pulse output across said last-named resistor.

10. An apparatus for generating rectangular pulse comprising
a function generator for generating square waves from the signal output of an AC signal source including
 a pair of input terminals;
 a resistor connected across said input terminals;
 a diode connected in series with a filter capacitor across said terminals to rectify signal input to said terminals;
 a first transistor having its base connected through a resistor to one of said terminals, its emitter connected directly to the other of said terminals and one side of said filter capacitor, and its collector connected through a resistor to the other side of said filter capacitor;
 a second transistor having its base connected directly to the collector of said first transistor, its emitter connected directly to the emitter of said first transistor, and its collector connected through a resistor to said second-mentioned side of said filter capacitor;
 a feedback resistor connected between the collector of said second transistor and the base of said first transistor;
 a feedback capacitor connected in parallel with said feedback resistor; and
 means for taking off the output from said function generator between the emitter and collector of said second transistor;
a third transistor having its emitter connected directly to that output terminal of said square wave generator which is connected to one side of said filter capacitor, its base connected through a capacitor to the other side of the output terminals of said square wave generator, its collector connected through a resistor to the other side of said filter capacitor, and its base also connected, through an adjusting resistor, to said other side of said filter capacitor;
a fourth transistor having its emitter connected directly to the emitter of said third transistor, its base connected directly to the collector of said third transistor and also, through a resistor, to its own emitter, and its collector connected through a capacitor to the base of said third transistor and also, through a resistor, to said other side of said filter capacitor; and
means to take off between the emitter and the collector of said fourth transistor a rectangular pulse function whose duration is determined by the values of said adjusting resistor and said capacitor connected between the collector of said fourth transistor and the base of said third transistor.

11. An apparatus including, as an AC signal source, an auxiliary oscillator;
a function generator for generating square waves from the signal output of an AC signal source comprising
 a pair of input terminals connected to the output terminals of said oscillator;
 a resistor connected across said input terminals;
 a diode connected in series with a filter capacitor across said terminals to rectify signal input to said input terminals;
 a first transistor having its base connected through a resistor to one of said input terminals, its emitter connected directly to the other of said input terminals and one side of said filter capacitor, and its collector connected through a resistor to the other side of said filter capacitor;

a second transistor having its base connected directly to the collector of said first transistor, its emitter connected directly to the emitter of said first transistor, and its collector connected through a resistor to said second-mentioned side of said filter capacitor;

a feedback resistor connected between the collector of said second transistor and the base of said first transistor;

a feedback capacitor connected in parallel with back resistor; and means for taking off the output from said function generator between the emitter and collector of said second transistor;

a resistor and capacitor connected in series across the output means of said square wave generator; and means for taking a trigger pulse output across said last-named resistor.

12. An apparatus including, as an AC signal source, an auxiliary oscillator; and an apparatus for generating rectangular pulses comprising a function generator for generating square waves from the signal source including a pair of input terminals connected to the output terminals of said oscillator;

a resistor connected across said input terminals;

a diode connected in series with a filter capacitor across said input terminals to rectify signal input to said terminals;

a first transistor having its based connected through a resistor to one of said input terminals, its emitter connected directly to the other of said input terminals and one side of said filter capacitor, and its collector connected through a resistor to the other side of said filter capacitor;

a second transistor having its base connected directly to the collector of said first transistor, its emitter connected directly to the emitter of said first transistor, and its collector connected through a resistor to said second-mentioned side of said filter capacitor;

a feedback resistor connected between the collector of said second transistor and the base of said first transistor;

a feedback capacitor connected in parallel with said feedback resistor; and means for taking off the output from said function generator between the emitter and collector of said second transistor;

a third transistor having its emitter connected directly to that output terminal of said square wave generator which is connected to one side of said filter capacitor, its base connected through a capacitor to the other side of the output terminals of said square wave generator, its collector connected through a resistor to the other side of said filter capacitor, and its base also connected, through an adjusting resistor, to said other side of said filter capacitor;

a fourth transistor having its emitter connected directly to the emitter of said third transistor, its base connected directly to the collector of said third transistor and also, through a resistor, to its own emitter, and its collector connected through a capacitor to the base of said third transistor and also, through a resistor, to said other side of said filter capacitor; and means to take off between the emitter and the collector of said fourth transistor a rectangular pulse function whose duration is determined by the values of said adjusting resistor and said capacitor connected between the collector of said fourth transistor and the base of said third transistor.

13. In combination, an alternating frequency generator, an amplifier including at least one transistor electrically connected thereto, a shunt across the output of the generator having a rectifier and a capacitor in series therein, and a resistor connecting the shunt between the rectifier and the capacitor with the collector of the transistor.

References Cited

UNITED STATES PATENTS

| 2,777,057 | 1/1957 | Pankove | 325—318 |
| 2,995,668 | 8/1961 | Sharaf | 307—239 |
| 3,022,454 | 2/1962 | Millis | 321—47 |
| 3,056,046 | 9/1965 | Morgan | 307—236 |

WARREN E. RAY, *Primary Examiner.*

U.S. Cl. X.R.

307—261, 273, 290; 321—16; 328—28, 207